United States Statutory Invention Registration [19]

[11] Reg. Number: H179

Klingensmith et al. [43] Published: Dec. 2, 1986

[54] POLYBUTYLENE

[76] Inventors: George B. Klingensmith, 1828 Milford, Houston, Tex. 77098; Thair L. Higgins, 1626 Elm St., El Cerrito, Calif. 94530

[21] Appl. No.: 675,669

[22] Filed: Nov. 28, 1984

Related U.S. Application Data

[63] Continuation-in-part of Ser. No. 517,499, Jul. 26, 1983, abandoned, which is a continuation-in-part of Ser. No. 331,106, Dec. 16, 1981, abandoned.

[51] Int. Cl.[4] ..... C08F 4/64; C08F 4/44; C08F 4/52

[52] U.S. Cl. ..... 526/125; 502/127; 526/348.6

[58] Field of Search ..... 526/125

[56] References Cited

U.S. PATENT DOCUMENTS

| | | | |
|---|---|---|---|
| 3,175,999 | 3/1965 | Natta et al. | 526/348.6 |
| 3,362,940 | 1/1968 | Edwards et al. | 526/348.6 |
| 3,385,817 | 5/1968 | Jones | 526/348.6 |
| 3,894,120 | 7/1975 | Frese et al. | 526/348.6 |
| 4,048,419 | 9/1977 | Frese et al. | 526/348.6 |
| 4,107,413 | 8/1978 | Giannini et al. | 526/125 |
| 4,107,414 | 8/1978 | Giannini et al. | 526/125 |
| 4,218,551 | 8/1980 | Frese | 526/348.6 |
| 4,287,328 | 9/1981 | Kikuta et al. | 526/348.6 |
| 4,294,948 | 10/1981 | Toyota et al. | 526/348.6 |
| 4,298,722 | 11/1981 | Collette et al. | 526/348.6 |
| 4,321,345 | 3/1982 | Sato et al. | 526/348.6 |

FOREIGN PATENT DOCUMENTS

| | | | |
|---|---|---|---|
| 2522 | 6/1979 | European Pat. Off. . | |
| 81787 | 6/1983 | European Pat. Off. . | |
| 1335887 | 10/1973 | United Kingdom | 526/125 |

*Primary Examiner*—John F. Terapane
*Assistant Examiner*—S. Wolffe

[57] ABSTRACT

A novel product of the polymerization of butene-1 is highly stereoregular but nevertheless has low crystallinity and has properties of a thermoplastic elastomer.

This elastomeric polybutylene is the total product. Its elastomeric qualitites lie between those of plasticized vinyl polymers and conventional vulcanized rubbers.

The butene-1 polymers may be compounded with extenders and fillers for use as molded or extruded elastomeric product or may be used without plasticizer addition in place of flexible vinyl polymers, such as highly plasticized poly(vinylchloride) PVC.

6 Claims, 8 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CONVENTIONAL POLYBUTYLENE EXPANDED

ELASTOMERIC POLYBUTYLENE EXPANDED

FIG.2 DAMPING CURVES
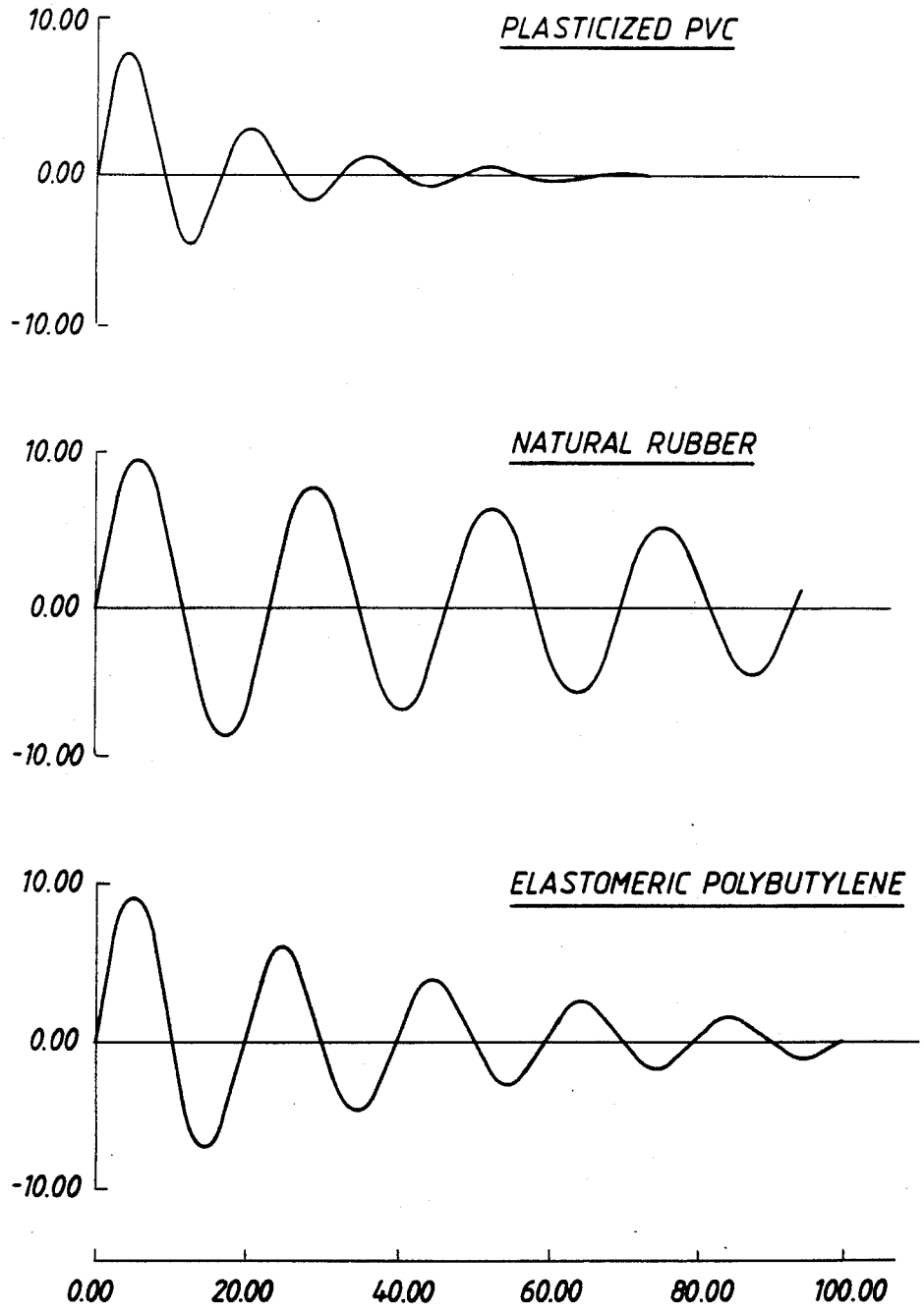

TYPE OF ELASTOMER

A SBR + 50 phr NON-REINFORCING CARBON BLACK
B S-B-S BLOCK COPOLYMER + 50 phr POLYSTYRENE
C S-EB-S BLOCK COPOLYMER + 100 phr POLYPROPYLENE
D S-B-S BLOCK COPOLYMER + 75 phr POLYSTYRENE
E SBR - VULCANIZED TREAD STOCK + 50 phr REINFORCING CARBON BLACK

POLYBUTYLENE

CROSS REFERENCE TO RELATED APPLICATION

This application is a continuation-in-part of Ser. No. 517,499, filed July 26, 1983, now abandoned, which was a continuation-in-part of Ser. No. 331,106, filed Dec. 16, 1981 and abandoned.

FIELD OF THE INVENTION

This invention relates to novel polymer of 1-butene.

BACKGROUND OF THE INVENTION

Thermoplastic, predominantly isotactic homo- and copolymers of 1-butene, referred to herein and in the trade as "polybutylene" or "poly-1-butene," are well known materials. Isotactic polybutylene is the subject of U.S. Pat. No. 3,435,017 of Natta et al. The properties and preparation of isotactic polybutylene are described, for example, in "Encyclopedia of Chemical Technology", edited by Kirk-Othmer, 2nd Ed., Suppl. Vol., pp. 773–787. Methods for producing such polybutylene are disclosed, i.e., in U.S. Pat. Nos. 3,362,940 and 3,464,962. Thermoplastic, predominantly isotactic butene-1 homopolymers of the type heretofore described in the literature, e.g., in U.S. Pat. Nos. 3,362,940 and 3,435,017, and produced commercially, are referred to herein as "conventional" polybutylene.

Conventional polybutylene is produced by contact of 1-butene with coordination catalysts which are generally referred to as Ziegler-Natta catalysts. Broadly, such catalysts are the products of contacting a compound of a transition metal of Group IV of the Periodic Table of Elements or of some other transition metals with an organometallic compound of a metal of Groups I–III.

For convenience of reference herein, the transition metal-containing components, which are typically solid, are referred to as "procatalysts", the organometallic compounds as "co-catalysts", and any additional stereoregulating compounds as "selectivity control agents", abbreviated "SCA".

Commercial Ziegler-Natta catalysts are designed to be highly stereoregulating in order to produce highly isotactic polyolefins.

Several generations of Ziegler-Natta coordination catalysts have acquired commercial importance in the production of isotactic polyolefins. Originally, a typical procatalyst was violet $TiCl_3$ in the delta or gamma crystal form, or a violet $TiCl_3$ complex, such as with $AlCl_3$. Several types of more active $TiCl_3$ procatalysts have since been developed and put to commercial use. The co-catalysts employed with $TiCl_3$ catalysts are aluminum alkyl compounds, typically halogen-containing aluminum alkyls such as aluminum diethyl halides.

During the last 10 years, more highly active catalysts systems have been developed, particularly for production of isotactic polypropylene. These typically comprise a support of magnesium chloride, which may have been activated such as by ball milling, combined with $TiCl_4$ and an electron donor—typically an aromatic ester such as ethyl benzoate. The co-catlayst is again an aluminum alkyl, typically an aluminum trialkyl. Generally an electron donor is employed as selectivity control agent. The cocatalyst may be complexed with the selectivity control agent in whole or in part, prior to being combined with the procatalyst. The purpose of the selectivity control agents is to increase the stereoregulating activity of the catalysts. Typical selectivity control agents are aromatic esters such as p-ethyl anisate. Numerous variants of these systems have been disclosed in the patent literature. These catalyst systems, referred to herein as supported coordination catalysts systems, are known to be substantially more active in the production of polypropylene than the most active $TiCl_3$-based catalyst systems of the prior art.

The goal of commercial Ziegler-Natta catalysis of propylene or higher alpha-monoolefins generally is the production of highly isotactic polymers. Isotacticity refers to the molecular structure of olefin polymer molecules. The isotactic structure in polyolefins is one in which all the assymetric carbon atoms have the same steric configuration. The isotactic structure of polybutylene is illustrated and discussed in U.S. Pat. No. 3,435,017 to Natta et al. High isotacticity of conventional polymers of butene-1 or of propylene is associated with high crystallinity of the polymers.

The crystallinity of conventional butene-1-homopolymers, determined by X-ray diffraction analysis, is typically in the range from 50 to 55%. Their isotacticity, determined by ether extraction, is typically in the range from 97.5% to 99.5%.

Another highly stereoregular form of polyolefins is known as "syndiotactic". In the syndiotactic structure, alternate assymetric carbon atoms have opposite steric configuration. Syndiotactic polybutylene is described by Natta et al. in Atti Acad. Naz. Lincei, Cl. Sci. Fis, Mat. Nat., Rend. [8 28, 4523 (1960)]. The polymer is an amorphous solid. It was prepared by hydrogenation of syndiotactic polybutadiene. Syndiotactic polyolefins are difficult to produce and are not at present of commercial interest.

Due to its crystallinity, conventional polybutylene exhibits significant stiffness, tensile strength, hardness, and other physical properties characteristics of such polymers as high density polyethylene and isotactic polypropylene. It also shares such other properties of these polyolefins as chemical inertness and dielectric properties.

Outstanding properties of conventional isotactic polybutylene are toughness, resistance to creep and resistance to environmental stress cracking. The exceptional resistance of polybutylene to environmental stress cracking, coupled with the good creep resistance, recommends the use of conventional polybutylene for pipe. The exceptional toughness makes it desirable for the production of film for packaging, since films of conventional polybutylene are significantly stronger than films of other common polyolefins of the same thickness.

Elastomeric polybutylene recovered as a small fraction of a product made with poorly stereoregulating catalysts is known from U.S. Pat. No. 3,435,017 to Natta et al. Another elastomeric polybutylene, having an isotacticity of no more than 50% and produced with a catalyst having poor stereoregulating activity is the subject of U.S. Pat. No. 4,298,722 to Collette et al.

References

"Encyclopedia of Chemical Technology, "Kirk-Othmer, 2nd Ed., Suppl. Vol., pp 773–797 provides a detailed description of the state of the art of polybutylene production in 1967; the commercial aspects have not significantly changed to date.

U.S. Pat. No. 3,435,017 to Natta et al. describes conventional isotactic polybutene-1 and its preparation and properties.

U.S. Pat. No. 3,175,999 to Natta et al. describes polymers of alpha olefins, primarily of propylene, which are designated "stereoisomer" block polymers. They are described as polymers in which isotactic sections alternate with non-isotactic (atactic) sections. Stereoblock polymers are said to be present in small concentrations in conventionally prepared Ziegler-Natta polymers; they must be recovered by a series of solvent extractions, as by treating some of the intermediate fractions of a sequential solvent extraction of Ziegler-Natta polymers with a solvent which has a dissolving capacity for the polyolefin intermediate between that of diethyl ether and n-heptane. In the illustrative examples, the catalysts are compositions which are now known to have poor or very poor stereoregulating ability. In Example 4 of the patent, a polymer of butene-1, produced with a catalyst prepared from vanadium tetrachloride and triethylaluminum, was extracted with hot ether and the residue of the ether extraction was then extracted with methylene chloride to obtain an extract, corresponding to 6% of the residue of the first extraction, which was said to have high reversible elasticity.

U.S. Pat. No. 4,298,722 to Collette et al. is directed to production of an elastomeric polybutene-1 which is made with a poorly stereoregulating catalyst and has an ether solubles content of at least 30% and isotacticity not exceeding 50%. The reaction products illustrated by example, listed in Table 3 of the patent, had ether solubles contents of 38–56% (determined before milling) and isotacticities of 23–46%.

While a large number of patents and patent applications have now been published directed to the production of supported coordination catalyst systems for the stereoregular polymerization of alpha olefins, the only one which have been noted as being specifically directed to the polymerization of butene-1 are the following three patent publications.

European Published Application No. 2522, published June 27, 1979, of Phillips Petroleum Company, is directed to the polymerization of butene-1 to form a polybutylene having the properties of conventional isotactic polybutylene. In order to accomplish this, the patent describes a modified catalyst preparation and a particular slurry polymerization process.

Japanese Kokai Patent No. 54/85293, published July 6, 1979, applied for in Japan on Dec. 21, 1977 by Mitsui Petrochemical Industries Company, is directed to the production of certain copolymers of butene-1 with another alpha monoolefin, having more than 60 but no more than 98% weight butene-1 content and preferably 70–90% butene-1 content and 30–10% propylene. These copolymers are said to have physical characteristics comparable to polyvinyl chloride.

Japanese Patent Application No. 51/23607 published Sept. 24, 1980, applied for in Japan by Mitsui Petrochemical Industries Company, is directed to a modification in the polymerization process for producing conventional polybutylene over catalysts employing as procatalysts a composite of titanium, magnesium, halogen and electron donor.

SUMMARY OF THE INVENTION

This invention is directed to a product of the polymerization of butene-1 which has high stereochemical order but nevertheless has low crystallinity and has properties of a thermoplastic elastomer. The polymer product of this invention is the total product, or substantially the total product, of homopolymerization of butene-1 over highly stereoregulating coordination catalysts. The butene-1 polymers of this invention are referred to herein as elastomeric polybutylene.

This product is characterized by an abrupt and discontinuous change in mechanical properties compared to conventional istoactic polybutylene. The properties of the latter are those of conventional thermoplastics while the product of this invention is elastomeric. This reflects a change from a level of crystallinity where the crystalline portion of the polymer dominates mechanical properties to a level where the amorphous phase dominates mechanical properties. Moreover, similarly to thermoplastic elastomer block copolymers, the polymer product of this invention behaves like a physically crosslinked elastomer, i.e., it behaves as if its elastomeric amorphous phase is bound together through a network of crystalline domains. Its elastomeric qualities lie between those of plasticized vinyl polymers and conventional vulcanized rubbers.

Like thermoplastic elastomers such as the well known commercial block copolymers based on styrene and diolefins or complex blends of polypropylene with elastomeric copolymers of ethylene and propylene, the butene-1 polymers of this invention may be compounded with extenders and fillers for use as molded or extruded elastomeric products. The butene-1 polymers of this invention are also useful for those uses where flexible vinyl polymers, such as highly plasticized poly(-vinylchloride) (PVC), have heretofore been employed. Unlike PVC, they do not require the use of plasticizers to achieve and retain the desired flexibility. They also do not have the disadvantages of potential health and safety problems associated with vinyl chloride monomer, with burning of PVC and with PVC plasticizers.

The elastomeric polybutylenes of this invention possess an unusual combination of properties, compared to other thermoplastic elastomeric polymers, in that they combine the resilience and flexibility typical of elastomers with the surface hardness characteristic of thermoplastic polyolefins such as conventional polybutylene.

BRIEF DESCRIPTION OF THE DRAWING

FIG. 2 is a graph of damping curves of elastomeric polybutylene of this invention, PVC and natural rubber.

DESCRIPTION OF THE INVENTION

Figure 1:
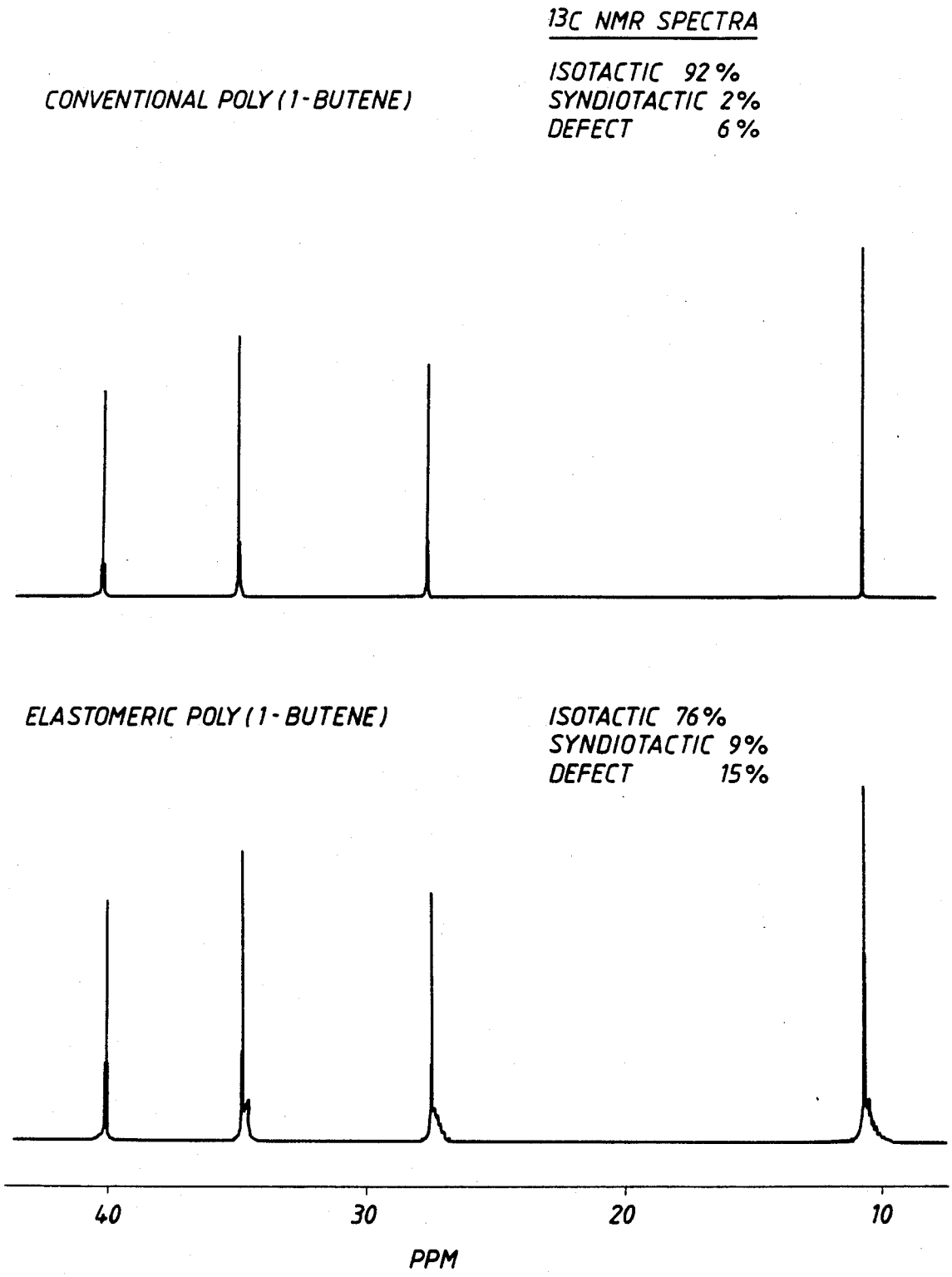
FIG. 1 of the drawing shows $^{13}C$ NMR spectra of conventional polybutylene and of elastomeric polybutylene of this invention.

Conventional polybutylene, as produced in polymerization with effective Ziegler-Natta type coordination catalysts, typically has an isotactic content greater than 92%, as determined by extraction with boiling diethyl ether. It typically exhibits a crystallinity of the order of 50–60% by X-ray diffraction analysis and has the tensile strength and stiffness characteristic of highly crystalline thermoplastics.

Like conventional polybutylene, the polybutylene products of this invention also are highly stereoregular. However, unlike conventional polybutylene, the polybutylene of this invention nevertheless exhibits crystallinity in the range of only 25–40% by X-ray diffraction analysis. Even though it has high steric order, the polybutylene of this invention exhibits physical properties characteristic of thermoplastic elastomers, such as the well known commercial block copolymers based on styrene and diolefins or complex blends of polypropylene with elastomeric copolymers of ethylene and propylene.

The elastomeric polybutylene of this invention is a total product of the homopolymerization of butene-1, characterized by the following properties:

| | |
|---|---|
| Solubility in refluxing diethyl ether, % wt | <10 |
| Crystallinity, by X-ray diffraction (Form I), % | 25–40 |
| $M_n \times 10^{-3}$ [a] | 20–300 |
| $M_w \times 10^{-3}$ [a] | 150–2,200 |
| $M_w/M_n$ | 4–8 |
| Melting Point[b], Form I, °C. | ~100–118 |
| Melting Point[c], Form II, °C. | ~98–110 |
| Tensile Strength | |
| At Yield, psi | 400–1700 |
| At break, psi | 3000–4500 |
| Elongation at break, % | 300–600 |
| Hardness, Shore A, 10 seconds | 50–90 |

In fractional crystallization method A, described below, the residue of the third recrystallization represents no more than about 25% of the total polymer.
[a]By gel permeation chromatography.
[b]By differential scanning calorimeter (DSC) at heating rate of 20° C./minute, using compression molded plaque, crystallized at 7° C.; after transformation to Form I.
[c]By DSC after crystallizing the melt at 10° C./minute cooling rate and then immediately heating at 20° C./minute.

In the preferred products of this invention, the total unextracted reaction product contains no more than 8%, and still more preferably no more than 5% of ether soluble components. The total polymerization products may be used without extraction or after extraction of all or a portion of the small ether soluble fraction, which owes its solubility to a combination of low steric regularity and low molecular weight.

Products of this invention having ether solubles contents close to the upper permissible limit may exhibit some degree of surface adhesion or stickiness. For some uses, e.g., as film or sheet, this may make it desirable to extract some or all of the other soluble portion. For other uses, e.g., for blending with other polymers, the presence of a small ether-soluble component may not be objectionable. Products having ether solubles content in the preferred lower ranges do not exhibit significant surface adhesion or stickiness even though they contain a large proportion of polymer soluble in boiling n-heptane, whereas polybutylenes produced with a relatively non-stereoregulating conventional coordination catalyst, which also exhibit relatively low crystallinity and are also relatively flexible compared to conventional polybutylene, exhibit high surface adhesion, resulting from a large fraction of low steric regularity.

Figure 3:
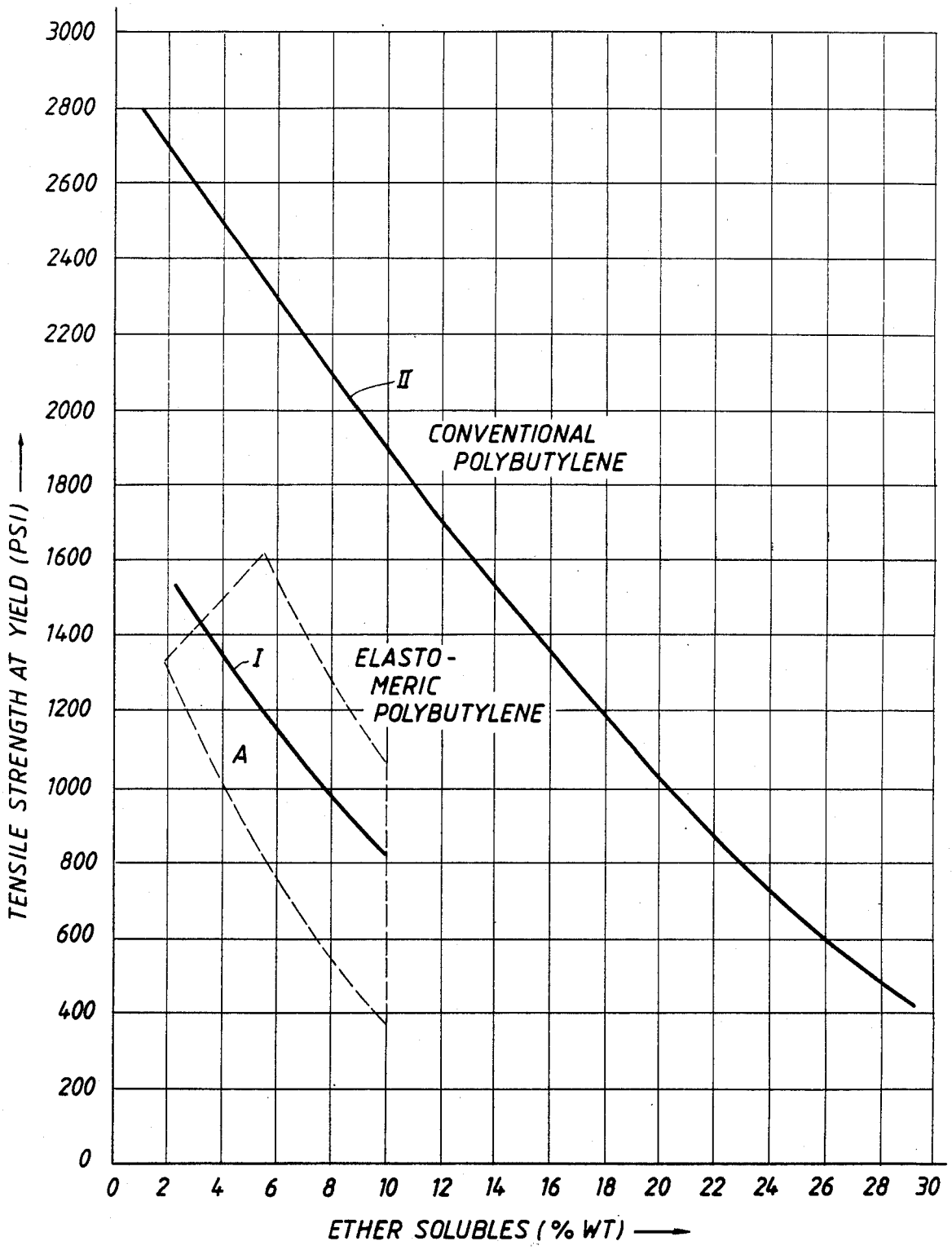
FIG. 3 is a plot of tensile yield strength v. ether solubles for elastomeric polybutylene and conventional polybutylene.

A prominent feature of our elastomeric polybutylene is its substantially suppressed level of crystallinity compared to conventional polybutylenes. A companion feature of our elastomeric polybutylene, one which makes it unique among the large number of polyolefins produced with stereoselective catalysts, is the fact that this suppression of crystallinity is achieved without the corresponding large increase in amount of easily extractable polymer (soluble in refluxing ethyl ether) which results when the crystallinity enhancing features of a conventional Ziegler-Natta polymerization system are removed or reduced. This is shown by the dramatically different correlation between extractable polymer concentration and tensile strength shown by our elastomeric polybutylene compared to conventional polybutylene as illustrated in FIG. 3. The origin of this unique relationship appears to lie in the co-enchainment of the isotactic sequences and sequences of frequent, mostly alternating (syndiotactic), tactic inversions of elastomeric polybutylene. On the other hand, stereoirregular species in conventional polybutylene largely coexist as separate fractions which are easily separable by extraction with ether.

Another distinguishing feature of our elastomeric polybutylene is its $^{13}C$ NMR spectrum. The $^{13}C$ NMR method provides detailed information about the configuration and conformation of short sections of polymer chains. A comparison of $^{13}C$ NMR spectra of conventional polybutylenes with those of the products of this invention indicates a significant difference between the products, even though they both have a very high degree of steric order. The difference shows up as a higher proportion of polymer comprised of short sequences of frequent tactic inversion alternating with longer isotactic sequences. This indicates for the products of this invention a structure of short average isotactic sequences, which contrasts strikingly with the long average isotactic sequences of conventional polybutylene.

The enchained tactic defect structure which alternates in a stereoblock structure with isotactic sequences in elastomeric polybutene-1 is responsible for the fine structure associated with the major $^{13}C$ NMR absorptions of polybutene-1. As evident in FIG. 1 and 1B, this fine structure is much more prominent in the spectrum of elastomeric polybutene-1 than it is in conventional polybutylene (1A). Integrated intensities of the absorbances in the 26 to 28 ppm region show 15% tactic defect structure associated with very short tactic inversion sequences (<5 monomer units) and 9% alternating (syndiotactic) tactic inversions in sequences ≧5 monomer units. By comparison, typical conventional polybutylene has only 6% defect structure and 2% alternating or syndiotactic sequence stereostructure. It is the larger amount of the net defect structure, enchained in not readily extractable molecules, that accounts for the elastomeric character of our new form of polybutylene.

$^{13}C$ NMR spectra of the fractionated polybutenes were recorded on a Bruker WM-360 spectrometer operating at 90.50 MHz under proton decoupling in FT mode. Instrument conditions were: 90° pulse of 50 μs, 9 s repetition rate, 14 KHz sweep width and 32 K FID. The numbers of transients accumulated were 1500 to 3000. Solutions of polymers were made up in 15 mm tubes with 0.5 to 1.0 g per 5 $cm^3$ of 2,2,4-trichlorobenzene with $N_2$ degassing. Temperature for measurement was 130° C. The chemical shift was presented in ppm down field from TMS as an external standard.

Like all products of olefin polymerizations with coordination catalysts, the products of this invention are mixtures of molecules differing from each other to some extent in structure and in molecular weight. The compositions and structures of such products are to some extent a function of the specific catalyst compositions and reactions conditions employed in their production.

The elastomeric polybutylene of this invention may be produced having a wide range of molecular weights. Number average molecular weights ($M_n$) may be from 20,000 to 300,000 and weight average molecular weights ($M_w$) from 150,000 to 2,200,000. A characteristic of the products of this invention is a narrow molecular weight distribution, as indicated by the ratio of $M_w/M_n$ (Q-value) which is typically of the order of 70 to 75% w or less of the Q-value of conventional polybutylene.

Both conventional and elastomeric isotactic polybutylene are unique compared to other commercial polyolefins in that they are capable of existing in several crystalline modifications which can be isolated in almost pure form. Conventional isotactic polybutylene typically first solidifies from the melt in the crystal form known as Type II. Type II is unstable with respect to Type I and converts to Type I at a rate depending on a variety of factors, such as molecular weight, tacticity, temperature, pressure, and mechanical shock. Properties of the several crystal forms of conventional isotactic polybutylene are well known. The transformation of Type II to Type I has a marked effect on the physical properties. Density, rigidity and strength are increased.

Like conventional polybutylene, our elastomeric polybutylene crystallizes from the metal in the form of crystal Type II, which transforms to crystal Type I over a period of hours or days, depending on environmental conditions.

Physical properties of elastomeric polybutylene of this invention, crystallized in Type I form, are shown in Table 1. Also shown in Table 1, for comparison, are corresponding properties of a butene-1 homopolymer produced on a commercial scale in a solution process.

TABLE I

| | Conventional PB | Elastomeric PB | |
|---|---|---|---|
| | Range | Range | Typical |
| Solubility in refluxing diethyl ether, % wt. | 0.5–2.5 | <10 | 1.5–8 |
| Crystallinity, % | 50–60 | 25–40 | 30–35 |
| $M_n \times 10^{-3}$ | 25–95 | 30–300 | 50–200 |
| $M_w \times 10^{-3}$ | 230–1540 | 150–2200 | 500–1500 |
| $M_w/M_n$ | 10–12 | 4–8 | 6–7 |
| Melting Point, Form I, °C. | 123–126 | ~100–118 | ~106–116 |
| Melting Point, Form II, °C. | 113–117 | ~98–110 | ~100–107 |
| Tensile Properties | | | |
| Tensile strength at yield, psi | 2200–2600 | 400–1700 | |
| Tensile strength at break, psi | 4500–5500 | 3000–4500 | |
| Elongation at break | 200–375 | 300–600 | |
| Hardness, Shore A, 10 sec. | | 50–90 | 75–87 |

Figures 1A, 1B:
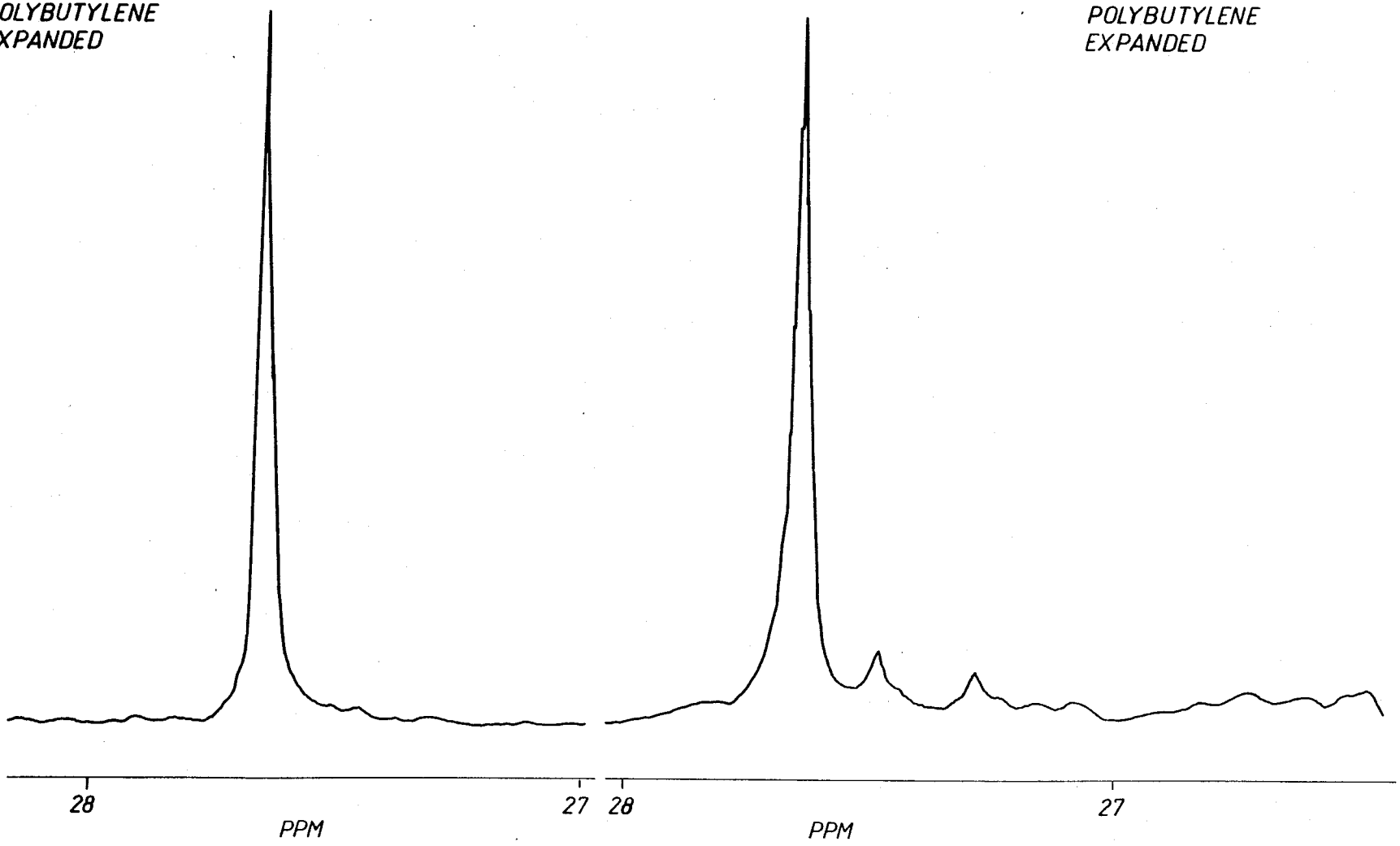
FIGS. 1A and 1B are expansions of the peak at about 28 ppm, showing the fine structure in greater detail.

The elastomeric character of polybutylene of this invention is demonstrated in FIG. 2 of the drawing, which shows damping curves of a typical plasticized PVC, of vulcanized natural rubber, and of a typical elastomeric polybutylene. Damping curves were determined by a free vibration torsion pendulum. Since the damping effect varies with the softness of the product it is accepted practice to recalculate damping curves for a product of uniform Shore Hardness. The curves in FIG. 1 are normalized for product of 75 Shore Hardness, method a (1 second). The ordinate is amplitude and the abscissa is time in centiseconds. The elastomeric polybutylene is shown to be more elastomeric than plasticized PVC, but less so than natural rubber.

FIG. 3 is a plot of tensile yield strength in pounds per square inch versus ether solubles content in percent by weight; it illustrates the difference between the elastomeric polybutylene of this invention and conventional polybutylene.

Area A represents a range of values measured on elastomeric polybutylene of this invention. Line I represents an average curve for these values. Line II represents average values of conventional polybutylenes.

Figure 4:
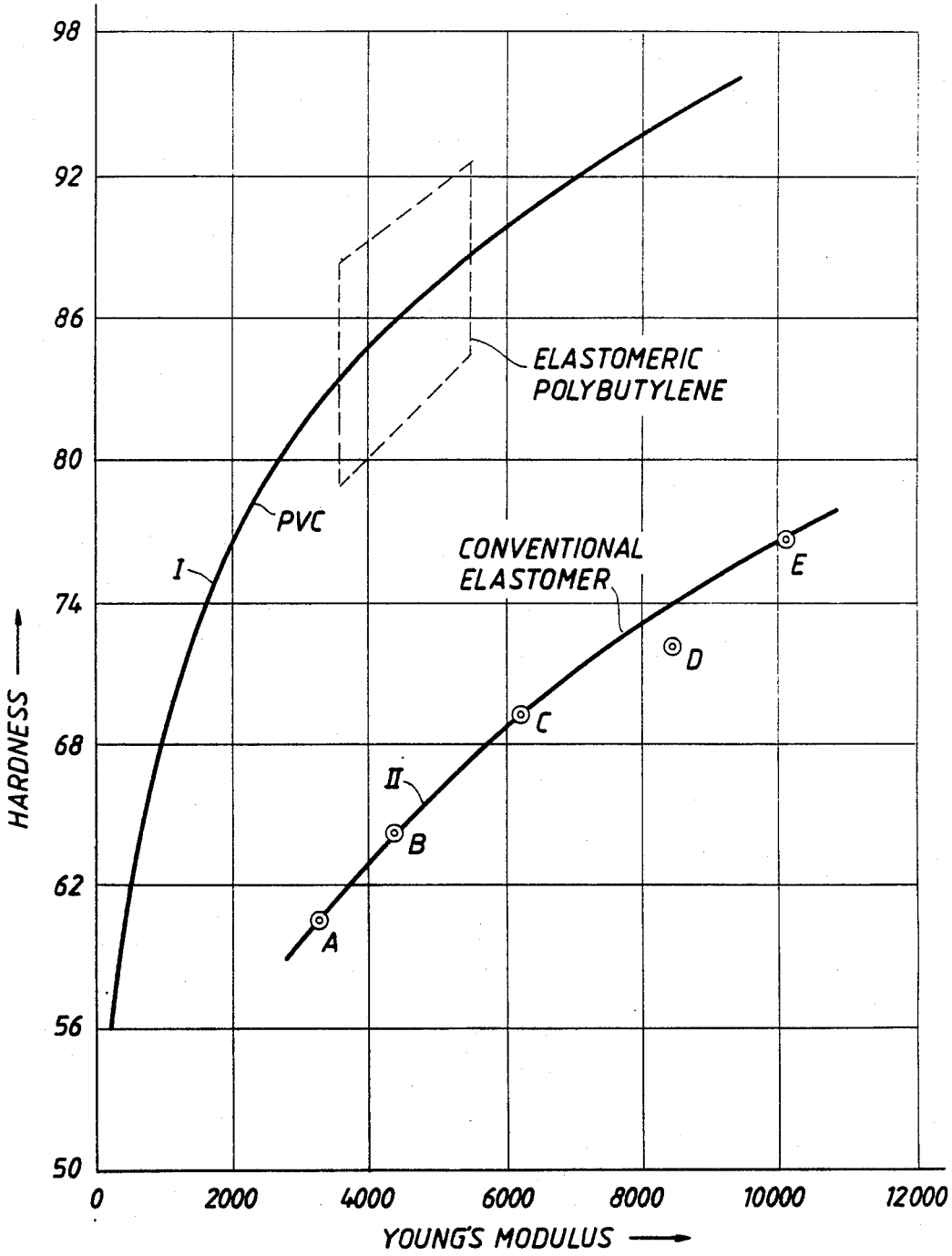
FIG. 4 is a plot of hardness v. flexibility as measured by Young's modulus, for elastomeric polybutylene, PVC and conventional elastomers.

FIG. 4 illustrates how polybutylene of this invention differs uniquely from conventional elastomers in exhibiting a greatly superior surface hardness at a given flexibility. It is a plot of hardness versus Young's modulus. Hardness is plotted as Shore Hardness, Method A, 10 seconds. Curve I is an average curve representative of commercial PVC, containing varying amounts of plasticizer to achieve varying degrees of flexibility. Area A represents a range of values for uncompounded elastomeric polybutylene of this invention. Curve II is an average curve of values obtained with different compounded elastomers, both vulcanized SBR and thermoplastic block copolymers, which are identified on the drawing.

While uncompounded polybutylene of this invention has certain properties where are close to those of compounded PVC, as shown in FIG. 4, it also has uniquely advantageous properties compared to PVC. This is illustrated in FIG. 5.

Figure 5:
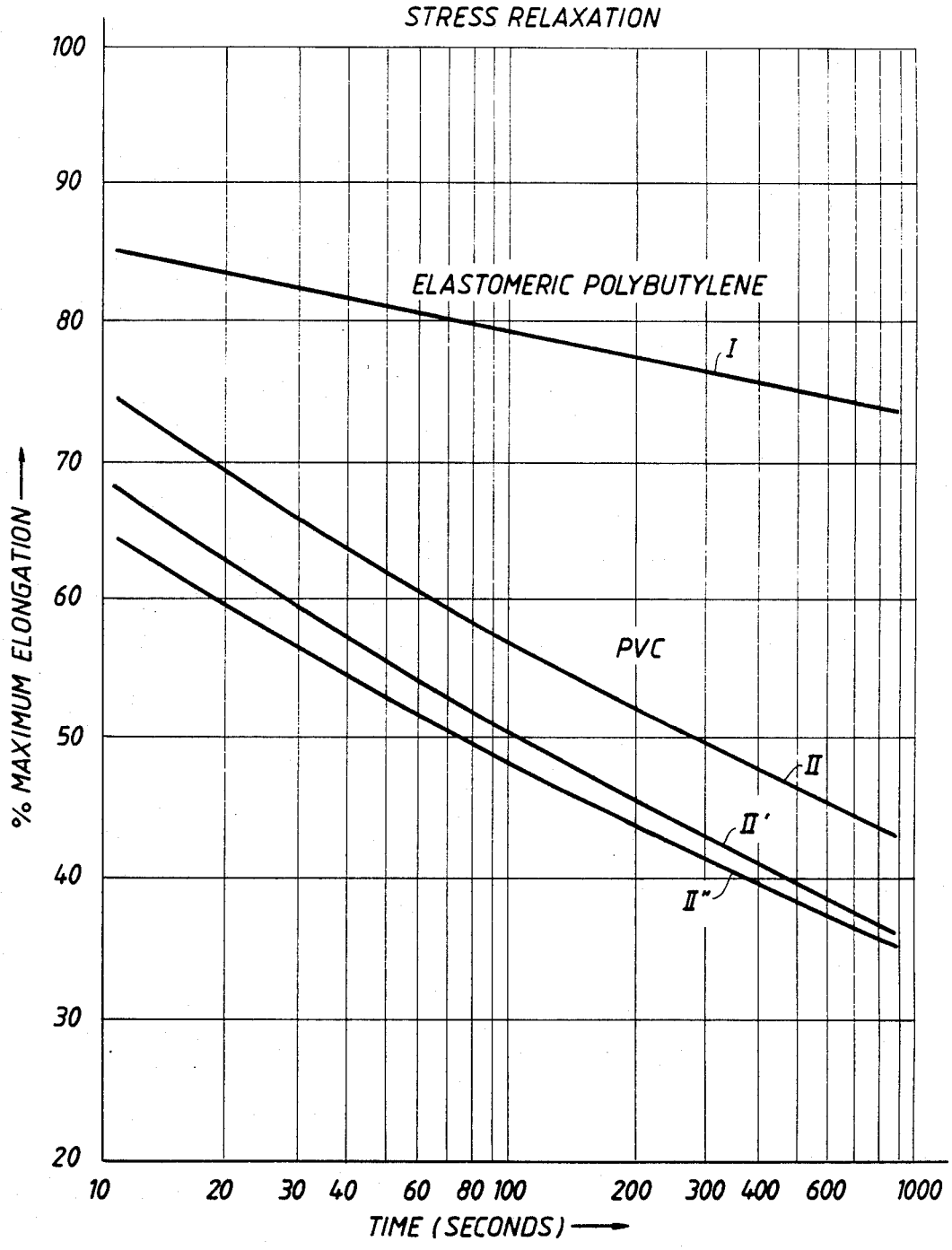
FIG. 5 is a stress relaxation plot for elastomeric polybutylene and for PVCs of different plasticizer contents.

FIG. 5 relates to stress relaxation. Curve I is measured on a polybutylene according to this invention and curves II, II' and II" on samples of commercial PVC containing different amounts of plasticizer and having nominal hardness values of 40, 65 and 95, respectively. The stress relaxation test is conducted by stretching a specimen to 300% of elongation and observing the decrease in stress as a function of time. In FIG. 5, the abscissa is a logarithmic scale of time in seconds and the ordinate is the percent of the initial stress at a given time.

It is seen that elastomeric polybutylene of this invention has a relatively low rate of stress relaxation. This property is particularly desirable in products to be used for seals, gaskets and the like.

Table 2 provides a comparison of representative properties of s sample of uncompounded elastomeric polybutylene of this invention with typical commercial PVC and elastomers. The elastomeric polybutylene was prepared as in Example 6.

The unique composition of elastomeric polybutylene of this invention, contrasted with conventional polybutylene which has been prepared at conditions leading to lower average isotacticity is demonstrated by fractional crystallization of the whole polymer from n-heptane. The method is regarded as representing a fractionation with respect to crystallizability of the polymer which in turn is believed to be determined by the distribution of isotactic sequences and tactic inversions in the polymer molecules. The procedure, referred to herein as fractional crystallization Method A, is carried out as follows:

100 grams of the total polymer is dissolved in 1 liter of n-heptane at 50°-60° C. The solution is cooled to ambient temperature of about 25° C. and allowed to stand for at least 24 hours, to permit complete precipitation of the polymer portion which is crystallizable at those conditions. The solid fraction is filtered off, washed with 1 liter of n-heptane, dried and weighed. The soluble fraction is recovered from the combined filtrate and wash liquid by evaporation of the solvent and weighed. The procedure is repeated with the total first precipitate and repeated twice more with the successive precipitates, using the same amount of n-heptane and the same conditions.

Figure 6:
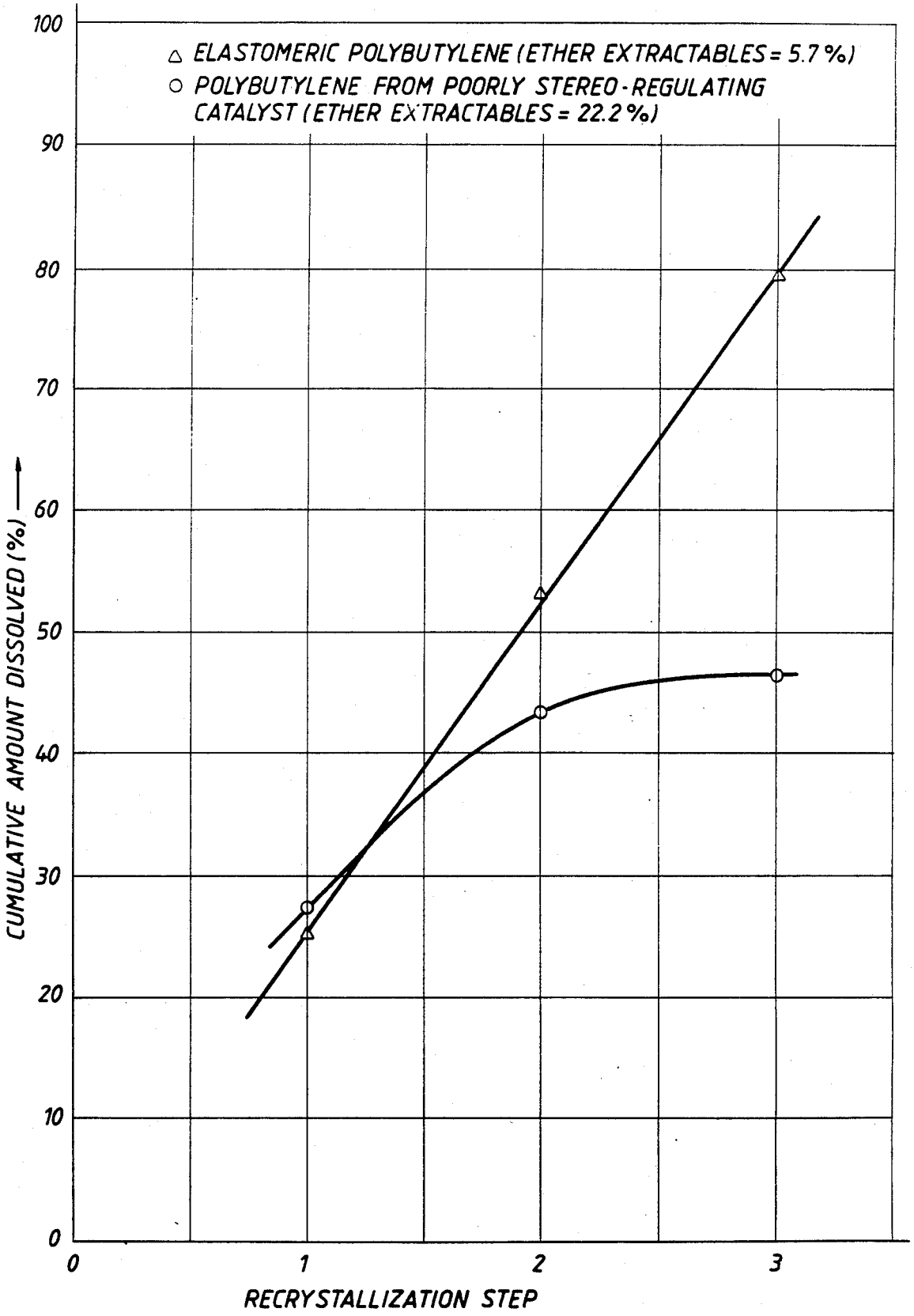
FIG. 6 is a plot of data of a recrystallization procedure comparing elastomeric polybutylene of this invention with polybutylene of relatively low stereoregulativity.

It has been found that in fractional precipitation of a typical polybutylene of this invention by this method, the percent by weight of the total polymer which remains dissolved in each stage is of the order of 25% of the total polymer. By contrast, when the same procedure was carried out on a conventional polybutylene which had been prepared with poorly stereoselective catalysts, and which had an ether extractable content of 22.2%, the amount of polymer which remained in the first filtrate was about 27% wt. but decreased to about 16% wt. and <4% wt. in the second and third filtrates, leaving more than 50% wt. as residue of the third recrystallization. These results are graphically illustrated in FIG. 6, which is a plot of cumulative amounts dissolved versus number of recrystallization steps.

TABLE 2

| | Uncompounded Elastomeric Polybutylene | PVC[a] | EPDM[b] | S-EB-S[c] Thermoplastic Elastomeric | Thermoplastic Polyurethane Elastomer[d] |
|---|---|---|---|---|---|
| Tensile strength, at break, psi | 4000 | 1800 | 2000 | 6000 | 7000 |
| Elongation at break, % | 600 | 300 | 600 | 600 | 500 |
| Tensile set at break, % | 125 | 300 | 200 | 50 | 40 |
| Hardness Shore A, 10 sec. | 83 | 65 | 75 | 80 | 80 |
| Young's Modulus, psi | 6500 | 3000 | 4500 | 5000 | 600 |
| Stress recovery, % | 80 | 25 | 35 | 70 | 60 |
| Hysteresis loss, % | 60 | 60 | 70 | 45 | 55 |
| Tear resistance, lbs/linear inch | 1100 | 600 | 450 | 500 | 700 |
| Resilience, % | 75 | 35 | 45 | 80 | 70 |
| Processing temperature, °F. | 350 | 350 | 450 | 500 | 500 |

[a]PVC plasticized with about 40% wt. dioctyl phthalate
[b]Mineral filled, vulcanized
[c]Uncompounded
[d]Polyether based Crystallization method A, carried out on conventional polybutylene, showed less than 4% soluble in the first recrystallization and essentially none in the later recrystallizations.

There are various theories with respect to the mechanism of polymerization over Ziegler-Natta catalysts. A widely held view is that the selectivity of Ziegler-Natta catalysts in alpha-olefin polymerization is simply a function of the relative populations of selective (isotactic) and non-selective (atactic) sites on the procatalyst. Accordingly, the isotacticity of a given unextracted polymer is considered to be determined by the relative proportions it contains of highly isotactic product polymerized at selective sites on the procatalyst and highly heterotactic (atactic) product polymerized at non-selective sites. The heterotactic fraction is non-crystallizable or only very slightly crystallizable and can be separated from the isotactic portion of the whole polymer by solvent extraction, e.g., in boiling n-heptane, as typically employed for polypropylene, or in boiling diethyl ether, typically employed for polybutylene. The amount of extractable polymer is the most commonly used indication of the selectivity of the catalyst and the isotactic purity of the polymer. Selectivity control agents which are employed in many commercial Ziegler-Natta systems to control isotacticity and hence crystallinity are regarded as preferentially deactivating non-selective catalyst sites.

We now believe that there is an additional dimension of stereoselectivity. This additional dimension has to do with the ability to some catalyst sites to exist for short duration in a mode which produces alternating tactic inversions in polymer molecules produced at otherwise isotactic selective sites. The inversions or short sequences of mostly alternating inversions (syndiotactic sequences) interrupt runs of isotactic sequences, producing isotactic blocks which are longer or shorter, depending upon the frequency or rate of inversion in relation to the rate of polymerization propagation at the particular active catalyst site. The isotactic stereoblocks will be long for catalysts where population of such dual mode sites is small and/or where the ratio $k_{isoztactic}/k_{inversion}$ is large, and/or where the time spent by a dual mode site in the inversion or syndiotactic mode is small. Such is the predominant situation in conventional Ziegler-Natta catalysis; the stereoblocks will be shorter for catalyst where these situations are reversed.

We have discovered that under certain operating conditions supported coordination catalyst systems appear to fall in the latter category in the polymerization of butene-1, as indicated by $^{13}C$ NMR analysis of the polymer products. Thus, the steric purity of polybutylene produced in such polymerizations appears to be not just a function of the relative proportions of isotactic and atactic catalyst sites but also a sensitive function of what appears to be highly specific chemistry leading to tactic inversions at isotactic sites.

Natta et al. described certain stereoisomer block copolymers in U.S. Pat. No. 3,175,999 as polymers in which isotactic sections alternate with atactic sections. The stereoisomer block copolymers were produced, as illustrated in the examples, with catalysts which have poor ability to produce isotactic polymers, and represented only small proportions of the total polymer product. In contrast to this, our elastomeric polybutylene can be produced as the total polymerization product by means of catalysts which are capable of being highly stereodirecting for the production of isotactic polymers. Our polymers may be produced by means of catalyst systems which, when employed in propylene polymerization, produce highly crystalline isotactic polypropylene. Our elastomeric polybutylene consists mainly of isotactic blocks, interrupted by inversions of only one or a few molecules largely in alternating (syndiotactic) stereochemical configurations.

The preferred catalyst to be employed for production of elastomeric polybutylene of this invention is one in which the solid component comprises a support of magnesium chloride in an active form, combined with an electron donor and titanium halide; typically the components are $MgCl_2$, $TiCl_4$ and an aromatic ester, e.g., ethyl benzoate or p-ethyl toluate. This solid component is combined with an aluminum alkyl, typically a trialkylaluminum such as triethyl aluminum and a selectivity control agent, typically ethyl anisate. Numerous variants of these catalysts are described in recent patents, such as U.S. Pat. Nos. 4,051,313; 4,115,319; 4,224,181; 4,235,984 and 4,250,287. Preferred to date are catalysts prepared as described in European Patent Applications 19,312 and 19,330, both published Nov. 26, 1980.

The conditions under which the polymerization is conducted, including the method of combining the catalyst components, can also affect the type of polymer produced. In a preferred method, all three catalyst components are pre-mixed before being introduced into the polymerization zone, and the procatalyst and cocatalyst are combined before the electron donor is combined with the catalyst mixture.

The polymerization is preferably conducted as a solution polymerization process, using butene-1 as the reaction medium. However, it may be conducted in liquid butene-1 at conditions under which the polymer is produced as a solid in a so-called slurry polymerization. The polymerization may be carried out in batch or continuous modes.

Suitable ratios of the several catalyst components are as follows:

Ti content of procatalyst, % wt.
  from about 1 to about 5
Al:Ti atomic ratio
  from about ≧50 to about 150; preferably from about 65 to about 100
SCA:Ti molar ratio
  from about ≧4.5 to about 20; preferably about 4.5 to about 15
Al:SCA molar ratio
  from about 5.1 to about 15:1
$H_2$:Ti molar ratio
  from about 0 to about 2500.

The interaction of procatalyst, cocatalyst, selectivity control agent and hydrogen in the production of isotactic polymers is basically the same in the production of elastomeric polybutylene as it is in the production of other istoactic polyolefins. However, it has been observed that the molar ratio of cocatalyst to titanium, when using appropriate amounts of SCA, is preferably not above 100 and should not exceed about 150. At ratios approaching and exceeding 150, the polymer product gradually becomes less elastomeric and more nearly like conventional polybutylene.

The catalysts employed in the production of elastomeric polybutylene may be of sufficiently high activity that no product deashing step is required. If catalyst residues are to be deactivated and removed, this may be accomplished by conventional means employed in cleanup of olefin polymers produced over such catalysts, e.g, by contact with an alcohol, followed by extraction with water.

The elastomeric polybutylene of this invention, which combines the chemical properties of polybutylene with physical characteristics resembling those of plasticized PVC and of thermoplastic elastomers, is expected to find many uses.

Unblended produces of this invention are relatively homogeneous materials of excellent chemical resistance as well as physiacl toughness. Polybutylene of this invention has been converted into films, including heavy gauge film useful for bagging of industrial powdered goods. It is also useful for conversion into stretchable plastic fibers and filaments.

For applications in which thermoplastic elastomers have theretobefore been employed, the products of this invention can be compounded and processed similarly to conventional hydrocarbon elastomers, e.g., by blending with other polymers such as polypropylene, with extenders such as mineral oils and waxes, and with fillers such as calcium carbonate, for use as molded or extruded products in various applications for which hydrocarbon elastomers are conventionally employed.

The butene-1 polymers of this invention are also useful for those uses where flexible vinyl polymers, such as highly plasticized poly(vinylchloride) (PVC), have heretofore been employed, including conversion into sheets and tubing for a variety of uses. Unlike PVC, they do not require the use of plasticizers to achieve and retain the desired flexibility. They do not have the disadvantages of potential health and safety problems associated with vinyl chloride monomer, with burning of PVC and with PVC plasticizers.

The butene-1 polymers of this invention share the chemical properties of conventional isotactic polybutylene. Additives relying on chemical action, such as stabilizers against deterioration due to heat or light, can be expected to have the same effectiveness in the polybutylene of this invention as in conventional polybutylene. The elastomeric polybutylene may also be modified by addition of fillers or pigments.

Mechanical properties reported in Table 2 and in the following examples were determined on compression molded specimens.

For the data in Table 2 and in FIGS. 2–5, the specimens were about 25 mil thick, prepared by compression molding at 350° F. and aged 7 days at room temperature for conversion to crystal form I.

For the data in the following examples, specimens were prepared by compression molding at 350°–400° F. and subjected to accelerated aging at room temperature for 10 minutes under 30,000 psi hydrostatic pressure for conversion to crystal form I.

For determination of ether extractables, a 2.5 gram film specimen or a similar amount of polymer crumb or extruded pellets is extracted in a Soxhlet extraction apparatus with 100 ml refluxing diethyl ether for 3 hours.

Melt index is determined according to ASTM method D–1238, Procedure A.

Tensile properties reported in the Examples are determined according to ASTM method D–638 on specimen about 0.10 inch thick and 0.24 inch wide. Tensile properties reported in Table 2 and in FIG. 3 are determined according to ASTM method D–412.

Other properties are determined by the following standard methods or variations thereof:

| | ASTM No. |
|---|---|
| Hardness, Shore A, 10 seconds | D-678 |
| Tear resistance | D-624 |
| Resilience | D-945[a] |

[a]using free vibration torsion pendulum.

The plot of stress v. strain of elastomers, including our elastomeric polybutylene, does not show the decrease of stress which defines the yield point for true thermoplastic resins. Rather, the curve shows a rise at an initial slope, a continued rise at a lesser slope, and a final rise to the break point, which may again be at an increased slope. The slope of the initial rise, expresses as psi, is Young's modulus. The slope of the next, more gradually rising part of the curve, is referred to as modulus of chain extension. The point at which these two slope lines intersect is taken as defining the yield stress.

The following examples illustrate the invention, but are not to be considered as limiting it.

EXAMPLES

Polymerization Method

Unless otherwise stated, polymerizations were carried out as follows:

2000 ml of carefully dried butene-1 (99.5% wt. pure) was charged to a dry 1-gallon autoclave reactor, equipped with a turbine type agitator. A predetermined amount of hydrogen was charged to the reactor from a calibrated pressure vessel. The reactor was heated to about 140° F. With the agitator operating at 1000 rpm, a freshly prepared slurry of all three catalyst components was injected; the temperature of the agitated reaction mixture was held at about 150° F. by heating or cooling, as required. Reactions were typically run for 1 hour, resulting in a solution of about 20% of polymer in butene-1. At the end of the run, the reactor contents were transferred to a 2-gallon vessel containing water. This killed the polymerization reaction, flashed off unreacted monomer, precipitated the polymer as solid crumbs, and transferred catalyst residue into the water phase. The solid polymer was recovered, chopped, inhibited with 0.1% wt. of 2,6-di-tert butyl-4-methyl phenol and dried in a vacuum oven.

EXAMPLES 1-5; COMPARATIVE EXAMPLES 1-3

Table 3 lists the results of a number of polymerizations conducted as described above. The procatalysts (solid catalyst components) employed are designated as follows:

Procatalyst

A: $TiCl_4$-$MgCl_2$-Ethyl benzoate (EB) composite

B: $TiCl_3 \cdot \frac{1}{3}AlCl_3$=commercial product Stauffer catalyst AA

In the examples of the invention shown in Table 3, the procatalyst was combined with other components as a suspension in n-heptane, containing 0.03 mmol Ti/per ml. The cocatalyst was triethyl aluminum (TEA) employed as a 25% wt. solution in n-heptane. The electron donor was p-ethyl anisate (PEA), employed as the neat liquid.

The amounts of the several catalyst components employed in each example are shown in Table 3.

In the examples of the invention shown in Table 3, the catalyst components were combined in a serum vial in a dry box, and injected into the reactor. Unless otherwise stated, the time elapsed while the components were combined and injected into the reactor was no more than three minutes.

The catalyst components were combined as follows:

In Example 1, PEA was added to TEA at room temperature and allowed to react for 10 minutes. This mixture and the procatalyst were separately injected into the reactor.

In Examples 2-5 and comparative Example 1, all three catalyst components were combined in a serum vial and the total catalyst mixture injected into the reactor.

The order of combination of the catalyst components was as follows:

Example 2:
TEA added to procatalyst;
PEA added to the mixture.

Example 3:
TEA added to procatalyst;
mixture held for 30 minutes at room temperature;
PEA added to the mixture.

Example 4:
Procatalyst added to TEA;
mixture added to PEA.

Example 5:
TEA added to procatalyst;
PEA added to mixture.

The method of Example 4 is preferred for production of SSPB. The method of Examples 2 and 5 is also satisfactory.

In Comparative Example 1, the order of addition was: TEA added to PEA; mixture added to procatalyst. This resulted in a total polymer having an excessively high content of ether soluble polymer.

Comparative Example 2 in Table 3 shows physical properties of a commercial butene-1 polymer, produced with a commercial $TiCl_3$ type Ziegler-Natta catalyst.

Comparative Example 3 in Table 3 was carried out in laboratory equipment of the same mode as that in Examples 1-5, but using a commercial $TiCl_3$ procatalyst.

EXAMPLES 6-9

Additional illustrative examples were carried out in a 20 gallon autoclave.

The catalyst components were used as described above, that is, the procatalyst was used as 0.03 mmol Ti per liter suspension in n-heptane, TEA as 25% wt. solution in n-heptane, and PEA added next. The procedure was essentially as described above, except that large amounts were employed. The autoclave contained about 50 pounds of carefully dried butene-1. 211 mmoles of hydrogen was added. The catalyst mixture was prepared by adding the procatalyst to the TEA and adding the resulting suspension to the PEA in 5 ml n-heptane. The total catalyst mixture was injected into the butene-1 in the autoclave, which was at 150° and held at that temperature, with agitation, for one hour.

Product recovery was as described above.

Reagent proportions and product properties are shown in Table 4.

TABLE 3

| | Procatalyst | | | Cocatalyst | | Electron Donor | | | Catalyst Activity | TOTAL POLYMER | | | | |
|---|---|---|---|---|---|---|---|---|---|---|---|---|---|---|
| | | | | | | | | | | | | TENSILE PROPERTIES | | |
| Example Number | Type | Ti Content % wt. | Amount Ti Charged mmols | Type | Amount mmols | Type | Amount mmols | $H_2$ Amount mmols | g Polymer/gm Procat/hr. | Ether Solubles % wt. | Melt Index gm/10 min. | Yield psi | Break psi | Elongation % |
| 1 | A | 2.87 | 0.03 | TEA | 2.0 | PEA | 0.14 | 5 | 3000 | 5.8 | 1.6 | 860 | 2720 | 374 |
| 2 | A | 2.87 | 0.03 | TEA | 2.0 | PEA | 0.21 | 5 | 3880 | 4.3 | | 1320 | 3740 | 350 |
| 3 | A | 2.87 | 0.03 | TEA | 2.0 | PEA | 0.36 | 5 | 4604 | 6.2 | 2.27 | 860 | 3110 | 438 |
| 4 | A | 2.87 | 0.03 | TEA | 2.0 | PEA | 0.14 | 5 | 3764 | 4.9 | 2.6 | 1088 | 3212 | 402 |
| 5 | A | 3.52 | 0.03 | TEA | 2.0 | PEA | 0.25 | 5 | 1975 | 4.8 | 0.46 | 1730 | 3660 | 310 |
| Comp. 1 | A | 2.87 | 0.03 | TEA | 2.0 | PEA | 0.14 | 5 | 5212 | 12.8 | 1.15 | 688 | 2940 | 445 |
| Comp. 2[a] | B | | | | | | | | | | 0.4 | 2730 | 5110 | 320 |
| Comp. 3 | B | | 0.44 gm | DEAC<br>DEAI | 8.5<br>2.0 | — | | 20 | 375 | 2.0 | 0.54 | 2680 | 4970 | 390 |

[a]Commercially produced isotactic poly-1-butene homopolymer.

TABLE 4

| Example Number | Procatalyst Type | Procatalyst Ti Content % wt. | Procatalyst Amount Ti Charged mmols | Cocatalyst Type | Cocatalyst Amount mmols | Electron Donor Type | Electron Donor Amount mmols | $H_2$ Amount mmols | Catalyst Activity g Polymer/gm Procat/hr. | TOTAL POLYMER Ether Solubles % wt. | TOTAL POLYMER Melt Index gm/10 min. | TOTAL POLYMER TENSILE PROPERTIES Yield psi | TOTAL POLYMER TENSILE PROPERTIES Break psi | TOTAL POLYMER TENSILE PROPERTIES Elongation % |
|---|---|---|---|---|---|---|---|---|---|---|---|---|---|---|
| 6 | A | 3.02 | 0.6 | TEA | 60 | PEA | 7.5 | 211 | 2400 | 9.5 | 0.99 | 810 | 2880 | 410 |
| 7 | A | 3.02 | 0.6 | TEA | 60 | PEA | 5.25 | 211 | 3350 | 7.6 | 1.74 | 790 | 3620 | 460 |
| 8 | A | 3.02 | 0.6 | TEA | 60 | PEA | 5.25 | 211 | 4120 | 5.7 | 1.67 | 740 | 3420 | 470 |
| 9 | A | 3.48 | 0.27 | TEA | 18.9 | PEA | 1.26 | 121 | 10,600 | 5.8 | 0.22 | 650 | 2360 | 360 |

EXAMPLE 10

Elastomeric polybutylene prepared as in Example 6 was converted by compression molding into a film of approximately 25 mil thickness. The film had the following properties;

| | |
|---|---|
| Melt index | 1.0 |
| Tensile strength at break, psi | 3970 |
| Elongation, % | 550 |
| Young's modulus | 6200 |
| Shore hardness A, 10 sec. | 83 |
| Trouser tear, lbs/linear inch | 1140 |
| Hysteresis loss, % | 59 |

What is claimed is:

1. Process for the production of a 1-butene homopolymer characterized by having reduced crystallinity due to enchained tactic defect structures, and by the following properties:

Solubility in refluxing diethyl ether, % wt. <8
Crystallinity (by X-ray diffraction (Form I), % 25–40
Melting point of Form I, °C. about 100–118
Tensile Strength (ASTM Method D-638)
At yield psi: 400–1700
At break psi: 3000–4500
Elongation at break, %: 300–600
Hardness, Shore A, 10 sec.: 50–90 which process comprises contacting butene-1 with a polymerization catalyst consisting essentially of:

(1) a procatalyst support obtained by contacting a magnesium halide with an electron donor and a titanium halide;
(2) an aluminum alkyl cocatalyst; and
(3) a selectivity control agent;

the ratios of the catalyst components being within the following ranges:

(a) titanium content of procatalyst, from about 1 to about 5% wt.;
(b) aluminum:titanium atomic ratio, from about 50 to about 150;
(c) selectivity control agent:titanium atomic ratio, from about 4.5 to about 20;
(d) aluminum:selectivity control agent molar ratio, from about 5:1 to about 15:1.

2. Process as claimed in claim 1 wherein the ratios of the catalyst components are with the following ranges:

(a) aluminum:titanium atomic ratio, from about 65 to 100;
(b) selectivity control agent:titanium atomic ratio, from about 4.5 to about 15;

3. Process as claimed in claim 1 wherein the process is carried out as a solution polymerization process in which the reaction solvent is 1-butene.

4. Process as claimed in claim 1 wherein all three catalyst components are pre-mixed before contact with the 1-butene, and the procatalyst and cocatalyst are combined before the election donor is combined with the catalyst mixture.

5. Process as claimed in claim 1 wherein the procatalyst and cocatalyst are in solution in an inert liquid hydrocarbon.

6. Process as claimed in claim 1 wherein the selectivity control agent is p-ethyl anisate.

* * * * *